United States Patent
Nezou et al.

(10) Patent No.: US 8,422,389 B2
(45) Date of Patent: Apr. 16, 2013

(54) METHOD AND DEVICE FOR THE ALLOCATION OF RELEASED BANDWIDTH IN A COMMUNICATIONS NETWORK, CORRESPONDING STORAGE MEANS

(75) Inventors: Patrice Nezou, Saint Sulpice la Foret (FR); Mounir Achir, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 12/835,516

(22) Filed: Jul. 13, 2010

(65) Prior Publication Data

US 2011/0019565 A1  Jan. 27, 2011

(30) Foreign Application Priority Data

Jul. 15, 2009  (FR) .................................... 09 54902

(51) Int. Cl.
- *H04L 1/00* (2006.01)
- *H04L 12/26* (2006.01)
- *H04L 12/28* (2006.01)
- *H04J 3/16* (2006.01)
- *H04J 3/22* (2006.01)

(52) U.S. Cl.
USPC ........................... 370/252; 370/254; 370/468

(58) Field of Classification Search .................. 370/252, 370/254, 468
See application file for complete search history.

(56) References Cited

U.S. PATENT DOCUMENTS

| | | | |
|---|---|---|---|
| 2005/0152391 A1 | 7/2005 | Effros et al. | 370/432 |
| 2007/0189298 A1* | 8/2007 | Wong et al. | 370/395.1 |
| 2007/0217339 A1* | 9/2007 | Zhao | 370/252 |
| 2009/0161572 A1 | 6/2009 | Lagrange et al. | 370/252 |
| 2010/0095002 A1 | 4/2010 | Viger et al. | 709/226 |
| 2010/0195556 A1 | 8/2010 | Tocze et al. | 370/312 |

OTHER PUBLICATIONS

French Search Report and Written Opinion dated Dec. 11, 2009 in corresponding French Application No. FR0954902, and English-language translation of the Written Opinion.
U.S. Appl. No. 12/905,060, filed Oct. 14, 2010 by Patrice Nezou, Pascal Lagrange and Lionel Tocze.
Koetter et al., "An Algebraic Approach to Network Coding", IEEE/ACM Transactions on Networking, vol. 11, No. 5, Oct. 5, 2003.
Ahlswede et al., "Network Information Flow", IEEE Transactions on Information Theory, vol. 46, No. 4, Jul. 2000.
D. Woldegebreal et al., "Outage Probability Analysis of Cooperative Transmission Protocols without and with Network Coding: Inter-user Channels based Comparison", 2007.
S. Katti et al., "XORs in The Air: Practical Wireless Network Coding", 2006.

* cited by examiner

*Primary Examiner* — Ronald Abelson
(74) *Attorney, Agent, or Firm* — Fitzpatrick, Cella, Harper & Scinto

(57) ABSTRACT

One embodiment of the invention pertains to a method for allocating bandwidth in a communications network, characterized in that it comprises steps for:
a) determining a subset of elementary networks from a set of possible elementary networks in a communications network, the elementary networks of the subset each being capable of simultaneously implementing a elementary network encoding scheme;
b) determining at least one critical destination node in the communications network;
c) allocating at least one bandwidth portion released by an application of the elementary network encoding scheme in at least one elementary network of the subset, for a transmission of at least one additional data unit to the at least one critical destination node.

23 Claims, 12 Drawing Sheets

METHOD AND DEVICE FOR THE ALLOCATION OF RELEASED BANDWIDTH IN A COMMUNICATIONS NETWORK, CORRESPONDING STORAGE MEANS

1. FIELD OF THE DISCLOSURE

The field of the invention is that of a meshed communications network.

More specifically, an embodiment of the invention pertains to a technique for allocating bandwidth in a communications network applying network encoding.

Indeed, the general principle proposed consists in listing elementary networks in each of which it is possible to implement an elementary network encoding scheme (i.e. a scheme that is local to this elementary network) and then checking to see if these elementary network encoding schemes are mutually compatible. This particular embodiment of the invention implements a network encoding suited to releasing resources and thus optimizing the decoding of the units given by the destination nodes of the network.

An embodiment of the invention can be applied especially but not exclusively in the context of a wireless meshed network. In such a network, access to the medium is based on a TDMA protocol where each node can access the medium in turn cyclically. More specifically, the transmissions are organized in an ordered time sequence which is repeated periodically. This ordered sequence consists of time spaces or bandwidth portions also called time slots during which a node of the network accesses the network and can send information.

In networks of this type, the data packets can be relayed by all or part of the nodes of the network to the destination nodes. This mode of transmission enables the final destination node to receive a group of copies which will be exploited in order to improve the quality of service of the application. These rules of re-transmission and reception can be put in the form of a re-transmission matrix shared by all the nodes of the network.

More specifically, the communications in a wireless meshed network are subjected to interference and shadowing which may appreciably impair the quality of the data received. In order to overcome these sources of imperfections, several methods may be implemented, providing spatial diversity and/or temporal diversity.

Spatial diversity, characterized by a repetition code, resolves the effect of shadowing by limiting packet losses caused by physical obstacles which interrupt communications.

Temporal diversity for its part can improve the robustness of the data by correcting a part of the errors of the data packet related to poor conditions of transmission in the network.

These two types of approaches are complementary and can be deployed in one and the same network.

In a wireless meshed network, the application of a spatial diversity type of method makes the network robust by increasing the possibility that the destination nodes will receive an accurate copy. Indeed, the source node sends an original data packet which, depending on the repetition code chosen, will be relayed or not relayed by another node of the network. The criterion of selection of the nodes that have to relay the packet is fundamental and determines the performance of the network.

The data copies received by the destination node are thus combined to attain a lower bit error rate (BER).

Network encoding is a well known technique (described in greater detail here below) that thus enables the efficient use of the shared medium (for example air in the case of a wireless communications network) through the transmission of a combination of packets (or more generically a combination of data units) in the form of only one packet to several destinations, so as to reduce the bandwidth needed to transmit data on the communications network.

However, it is necessary to make sure that the use of such a network encoding does not impair the quality of service to a level below that of the quality required by the application used in the network.

2. BACKGROUND OF THE DISCLOSURE

In the remaining part of this document, we shall strive more particularly to describe the existing issues and questions that were faced by the inventors of the present application in a context of network encoding in a wireless mesh network. An embodiment of the invention is of course not limited to this particular context of application but is worthwhile in all cases of network encoding adapted to the transmission, through relay nodes, of data packets from one or more source nodes to destination nodes in a mesh communication network.

A wireless mesh communication network consists of a set S of M source nodes and a set $D_t$ of N destinations nodes. The transmissions concerned are known as multicast transmission, i.e. each data packet sent by a source node is addressed to all the destination nodes of $D_t$. The other nodes are relay nodes, used to retransmit the source packets sent by the source nodes. The topology of the network is assumed to be known, i.e. all the radio qualities (such as the radio power received) between two communicating nodes are known.

Relay nodes classically have the function of retransmitting one of the packets that they have received at input (routing function). In the context of network encoding, these relay nodes have a new functionality: they have the capacity to send a resultant packet which is a combination of the packets received at input.

The concept of network encoding was introduced by R. Ahlswede and al (see: R. Ahlswede, N. Cai, S.-Y. R. Li and R. W. Yeung "*Network Information Flow*" I.E.E.E. Transactions on Information Theory Vol 46, No 4, pp 1204-1216, July 2000) and very soon, many other articles were published demonstrating the contribution made by this new concept, especially in terms of bandwidth gain and use of network capacity.

The following is commonly called a network encoding scheme:
  all the combinant relay nodes of the packets at input to generate a combined packet called a resultant packet;
  for these combinant relay packets, the input packets to be combined among all the packets received;
  each input packet to be combined has an associated coefficient in $F_q$.

These combinant relay nodes and these packets (they are included in the network encoding scheme) are considered to be payload elements while the others are considered to be redundant. The destination nodes then receive a plurality of packets which are a linear combination of the source packets (packets sent by the source nodes). From these received packets, they compute a decoding matrix which will enable the decoding of the source packets (i.e. the building of the source packets reconstituted from received packets).

In the prior art, there are mainly two approaches to building a network encoding scheme as a function of knowledge or lack of knowledge of the initial topology of the network.

In the prior art, there are chiefly two approaches to building a network encoding scheme as a function of the knowledge or lack of knowledge of the initial topology of the network:

For a known topology, a first deterministic scheme for building coefficients based on a matrix approach is given in the following article: R. Koetter, M. Médard, "*An Algebraic Approach to Network Coding*" ACM transactions on Networking, Vol 11, No 5, October 2003". The network encoding scheme obtained according to this first approach is called a "deterministic encoding scheme";

For an unknown topology, a construction on the fly of the randomly drawn coefficients is given by: Michelle Effros, Tracey Ho, David Karger, Ralf Koetter, Muriel Medard, in "Randomized distributed network coding" (cf U.S. patent application; 20050152391). The network encoding scheme obtained according to this second approach is called a "random encoding scheme".

In the first approach, the coefficients are computed once and for all at the start of the system and therefore during the lifetime of the system. The destination nodes and the relay nodes entail low-cost operations because they know exactly what they are going to receive and transmit.

In the second approach, the relay nodes randomly draw the coefficients of the resultant packet to be generated. This requires an additional processing time. Furthermore, they are obliged to send the randomly drawn coefficients in the resultant packet so that the other nodes, and more especially the destination nodes, know the linear combinations for decoding. This signaling (the sending of the coefficients) is especially great as the Galois field is great (each coefficient will be encoded on a greater number of bits) and this amounts to as much lost bandwidth. Now in this second approach, the greater the Galois field, the greater are the chances of success in the decoding of the source packets. This means there must be a necessary compromise between the size of the field and the bandwidth used for the signaling.

At present, as far as the inventors know, there is no method which can be used to:
enable a simple and automatic way of determining, by means of a deterministic approach, the nodes that can participate in network encoding in a meshed network as a function of communications condition; and
optimally allocating the bandwidth in the meshed network applying the network encoding.

3. GOALS OF THE DISCLOSURE

The invention in at least one embodiment is aimed especially at overcoming these different drawbacks of the prior art.

More specifically, it is an aim of at least one embodiment of the invention to provide a technique for simply and automatically determining the relay nodes that can participate in the application of a network encoding in a meshed network, on the basis of a predetermined repetition scheme implemented by these relay nodes and for allocating the bandwidth in an optimized way in the network applying the network encoding.

It is an additional goal of at least one embodiment of the invention to provide a technique of this kind for ensuring that despite the application of the network encoding the quality of service does not become lower than that required by the application deployed on the network.

It is an additional aim of at least one embodiment of the invention to provide a technique of this kind that is simple to implement and costs little.

It is another aim of at least one embodiment of the invention to provide a technique of this kind that can be used in the context of a wireless meshed network applying a method of the spatial diversity type (with adaptive repetition code).

4. SUMMARY OF THE DISCLOSURE

One particular embodiment of the invention proposes a method for allocating bandwidth in a communications network.

Remarkably, this method comprises steps for:
a) determining a subset of elementary networks from a set of possible elementary networks in a communications network, the elementary networks of said subset each being capable of simultaneously implementing a elementary network encoding scheme, the implementation of an elementary network encoding scheme enabling the release of a portion of bandwidth that can serve for the transmission of at least one data unit;
b) determining at least one critical destination node in the communications network, a destination node being said to be critical when it has not been able to accurately decode at least one received data unit;
c) allocating at least one bandwidth portion released by an application of said elementary network encoding scheme in at least one elementary network of said subset, for a transmission of at least one additional data unit to said at least one critical destination node, enabling an improvement in the decoding capacity of said at least one critical destination node.

Thus, this particular embodiment of the invention relies on a wholly novel and inventive approach for:
building not a total network encoding scheme (taking account of the network in its totality) but a plurality of elementary network encoding schemes which can cohabit;
optimizing the decoding of the data received by each destination node by the use of the resources (or bandwidth portions) released by the application of at least one network encoding scheme from among said plurality of network encoding schemes.

Indeed, the general principle proposed consists in listing elementary networks in each of which it is possible to implement an elementary network encoding scheme (i.e. a scheme local to this local elementary network) and then ascertaining that these elementary network encoding schemes are mutually compatible.

Thus, where a classic network encoding scheme taking account of the network in its totality would not be applicable (according to well-known criteria as described here above), this particular embodiment of the invention implements a network encoding adapted to releasing resources and thus optimizes the decoding of the data by the destination nodes of the network.

Advantageously, in the step b), a destination node is said to be critical when a bit error rate or a symbol erasure rate associated with said destination node is above a predetermined threshold of accurate decoding of a data unit, said threshold indicating a minimum decoding quality.

Thus it is not necessary to make additional calculation requiring additional resources.

Thus, the proposed technique is simple to implement and costs little. This list is not exhaustive.

According to an advantageous embodiment of the invention, in the step b), said at least one received data unit making it possible to determine whether a destination node is critical is the last data unit received by said destination node.

Thus, an embodiment of the invention averts the saving of an excessively large number of pieces of data.

According to an advantageous characteristic, the step c) comprises, for at least one released bandwidth portion, a step for selecting a critical destination node from among a plurality of critical destination nodes determined at the step b), said step for selecting comprising steps for:

c1) determining the critical destination nodes that would become non-critical through the allocation of said released bandwidth portion;

c2) selecting a destination node from among those determined at the step c1), and, for at least one released bandwidth portion, transmitting at least one additional data unit to the critical destination unit selected in the step c2).

Thus, the quality of service required by the application used in the network is improved.

According to another particular characteristic, the step for selecting c2) is performed among the destination nodes that have become critical after said application of said elementary network encoding scheme in at least one elementary network of said subset.

Thus, the choice of the destination nodes is optimized and an embodiment of the invention corrects the disturbances, in terms of decoding of the data elements provided by the application of the network encoding once these data elements have a direct impact on the decoding of the data at the level of the destination node concerned.

According to another particular characteristic, the step for selecting c2) is performed among the critical destination nodes having a bit error rate or a symbol erasure rate for which the difference with said predetermined accurate decoding threshold for the accurate decoding of one data unit is the greatest.

Thus, by allocation of bandwidth to the nodes that have the greatest need of resources, the quality of service required by the application deployed on the network is optimized.

According to one particular characteristic, the step c2) comprises steps for:

c2-i) estimating, for each destination node among those determined at the step c1), a first and second value of said bit error rate or said symbol erasure rate associated with the destination node, respectively without and with the allocation of said released bandwidth portion;

c2-ii) determining, for each critical destination node among those determined at the step c1), the difference between first and second estimated values;

c2-iii) selecting, among the destination nodes determined at the step c1), the destination node whose difference between said first and second values is the greatest.

Thus, the quality of service required by the application deployed on the network is improved by allocating the resource for a data unit transmission to a destination node, among the critical destination nodes, that would undergo the best improvement of said value of the criterion of decoding quality and would become non-critical through the allocation of said resource (or released bandwidth portion).

According to another particular characteristic, if no node is determined at the step c1), said step for selecting comprises steps for:

c3-i) estimating, for each critical destination node among those determined at the step b), a first and second value of said bit error rate or said symbol erasure rate associated with the destination node, respectively without and with the allocation of said released bandwidth portion;

c3-ii) determining, for each critical destination node among those determined at the step c1), the difference between first and second estimated values;

c3-iii) selecting, among the destination nodes determined at the step b), the destination node whose difference between said first and second values is the greatest.

Thus, the quality of service required by the application deployed on the network is improved by allocating the resource for a data unit transmission to a destination node, among the critical destination nodes, that would undergo the best improvement of said value of the criterion of decoding quality and would remain critical following the allocation of said resource (or released bandwidth portion).

According to one alternative embodiment, the critical destination node is the one possessing the greatest value of the criterion of decoding quality, i.e. the destination node that is capable of carrying out a data decoding in the least efficient way.

According to an advantageous characteristic, the step c) comprises, for at least one released bandwidth portion, steps for:

creating an additional elementary network through the allocation of said released bandwidth portion, said additional elementary network belonging to said subset of elementary networks and making it possible, by application of an elementary network encoding scheme, to release a portion of additional bandwidth that can serve for the transmission of at least one data unit;

determining at least one additional critical destination node associated with said additional elementary network;

allocating said released additional bandwidth portion for a transmission of data units to said at least one additional critical destination node.

Thus, an embodiment of the invention increases the number of critical destination nodes in the communications network that are suited to receiving data following an allocation of released bandwidth portion. Thus, the quality of service is optimized by the application deployed on the network.

Advantageously, the steps a), b) and c) are performed for at least two subsets of different elementary networks, said method comprising steps for:

determining, for each subset of elementary networks applying at least one elementary network encoding scheme, a cumulated value of a symbol erasure rate associated with the destination nodes of the communications network; and selecting the subset possessing the smallest value of said cumulated symbol erasure rate, indicating a maximum decoding quality.

Thus, the subset selected will be one which, from among each subset of elementary networks capable of applying the network encoding, enables the maximum optimizing of the quality of service of the network.

Advantageously, the step for selecting is performed from among said subset of elementary networks comprising solely destination networks that have remained non-critical after application of the elementary network encoding scheme.

Thus, the computation time is optimized by a preliminary section of the set of subsets comprising solely destination nodes that have remained non-critical after application of the elementary network encoding scheme.

An embodiment of the invention pertains to a computer-readable storage means storing a computer program comprising a set of instructions executable by a computer to implement the above-mentioned method (in any of its different embodiments).

In another embodiment, the invention pertains to a method for configuring, making it possible to determine nodes participating in a network encoding in a meshed network comprising a plurality of nodes.

This method is remarkable in that it comprises steps for:
determining a set of elementary networks each being capable of implementing an elementary network encoding scheme and each comprising:
- a combinant relay node making it possible to obtain a resultant packet by combining, according to said elementary network encoding scheme, at least two data packets received by the combinant relay node and each intended for one of at least two nodes that are direct descendants of the combinant relay nodes;
- at least one node that is a direct ancestor of the direct descendant nodes, that is different from the combinant relay node and enables the transmission to each direct descendant node of a copy of each data packet intended for the other direct descendant nodes;
- said at least two direct descendant nodes, each direct descendant node being capable of retrieving the data packet that is intended for it, from the resultant packet and from the copy of each data packet intended for the other direct descendant nodes;

selecting a first subset of said set of elementary networks, such that the combinant relay node of each elementary network of said subset is not a direct ancestor node of another elementary network of said first subset. Advantageously, this method comprises a step for:
selecting a second subset of said set of elementary networks such that, for at least one of the direct descendant nodes of each elementary network of said second subset, a level of overall quality of a transmission between a source node and said direct descendant node is greater than a predetermined threshold when said predetermined network encoding scheme is applied by the combinant relay node included in said elementary network;
said first subset being a subset of said second subset.

According to a particular characteristic, this method comprises a step for:
selecting a second subset of said first subset of elementary networks such that for at least one of the direct descendant nodes of each elementary network of said second subset, a level of overall quality of a transmission between a source node and said direct descendant node is above a predetermined threshold when said predetermined network encoding scheme is applied by the combinant relay node included in said elementary network.

According to a particular characteristic, said overall quality level corresponds to a computation belonging to the group comprising:
- a computation of a binary error rate;
- a computation of a symbol erasure rate.

In another embodiment, the invention pertains to a device for allocating bandwidth in a communications network.
This device is remarkable in that it comprises:
first means for determining a subset of elementary networks from a set of possible elementary networks in a communications network, the elementary networks of said subset each being capable of simultaneously implementing a elementary network encoding scheme, the implementation of an elementary network encoding scheme enabling the release of a portion of bandwidth that can serve for the transmission of at least one data unit;
second means for determining at least one critical destination node in the communications network, a destination node being said to be critical when it has not been able to accurately decode at least one received data unit;
first means for allocating at least one bandwidth portion released by an application of said elementary network encoding scheme in at least one elementary network of said subset, for a transmission of at least one additional data unit to said at least one critical destination node, enabling an improvement in the decoding capacity of said at least one critical destination node.

Advantageously, a destination node is said to be critical when a bit error rate or a symbol erasure rate associated with said destination node is above a predetermined threshold of accurate decoding of a data unit, said threshold indicating a minimum decoding quality.

Advantageously, said at least one received data unit making it possible to determine whether a destination node is critical is the last data unit received by said destination node.

According to an interesting characteristic, this device comprises, for at least one released bandwidth portion, first means for selecting a critical destination node from among a plurality of critical destination nodes, said selection means comprising:
third means for determining critical destination nodes that would become non-critical through the allocation of said released bandwidth portion;
second means for selecting a destination node from among those determined by said third determining means.

According to an advantageous characteristic, said second selection means enable the selection of the destination nodes from among the destination nodes that have become critical after application of elementary network encoding scheme.

Advantageously, said second selection means enable the selection of the nodes from among the critical destination nodes having a bit error rate or a symbol erasure rate for which the difference with said predetermined accurate decoding threshold for the accurate decoding of one data unit is the greatest.

According to one particular characteristic, this device comprises:
first means for estimating, for each destination node among those determined by said third determining means, a first and second value of said bit error rate or said symbol erasure rate associated with the destination node, respectively without and with the allocation of said released bandwidth portion;
fourth means for determining, for each destination node among those determined by said third determining means, of the difference between first and second estimated values;
third means for selecting, among the destination nodes determined by said third determining means, the destination node whose difference between said first and second values is the greatest.

Advantageously, said third selection means comprise:
second means for estimating, for each critical destination node among those determined by said second determining means and if no node is determined by said third determining means, a first and second value of said bit error rate or of said symbol erasure rate associated with the destination node, respectively without and with the allocation of said released bandwidth portion;
fifth means for determining, for each critical destination node among those determined by said second determining means, the difference between said first and second estimated values;
fourth means for selecting, among the destination nodes determined by said second determining means, the destination node whose difference between said first and second values is the greatest.

According to an advantageous characteristic this device comprises, for at least one released bandwidth portion:

means for creating an additional elementary network through the allocation of said released bandwidth portion, said additional elementary network belonging to said subset of elementary networks and making it possible, by application of an elementary network encoding scheme, to release a portion of additional bandwidth that can serve for the transmission of at least one data unit;

sixth means for determining at least one additional critical destination node associated with said additional elementary network;

second means for allocating said released additional bandwidth portion for a transmission of data units to said at least one additional critical destination node. Also, this device comprises:

seventh means for determining, for each subset of elementary networks applying at least one elementary network encoding scheme, a cumulated value of a symbol erasure rate associated with the destination nodes of the communications network; and fifth means for selecting, among at least two subsets of different elementary networks, a subset possessing the smallest value of said cumulated symbol erasure rate, indicating a maximum decoding quality.

Advantageously, said fifth selection means enable a selection, from among said subset of elementary networks comprising solely destination networks that have remained non-critical after application of the elementary network encoding scheme.

5. BRIEF DESCRIPTION OF THE DRAWINGS

Other objects, features and advantages of the invention shall appear from the following description, given by way of an indicative and non-restrictive example and from the appended drawings, of which:

Figure 1:
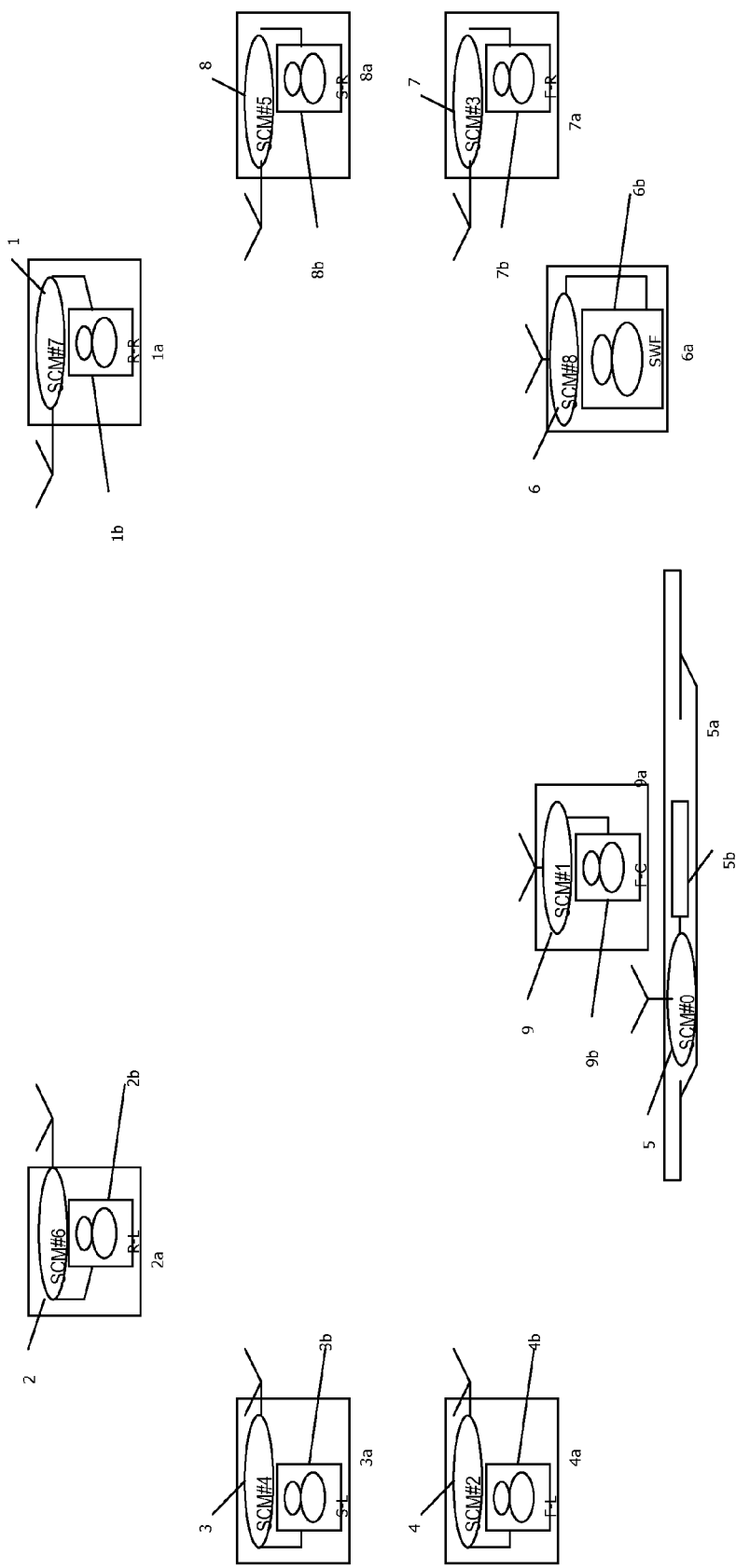
FIG. 1 is a drawing of a first wireless meshed network in which the bandwidth allocation method according to the particular embodiment of the invention can be implemented.
Figure 5:
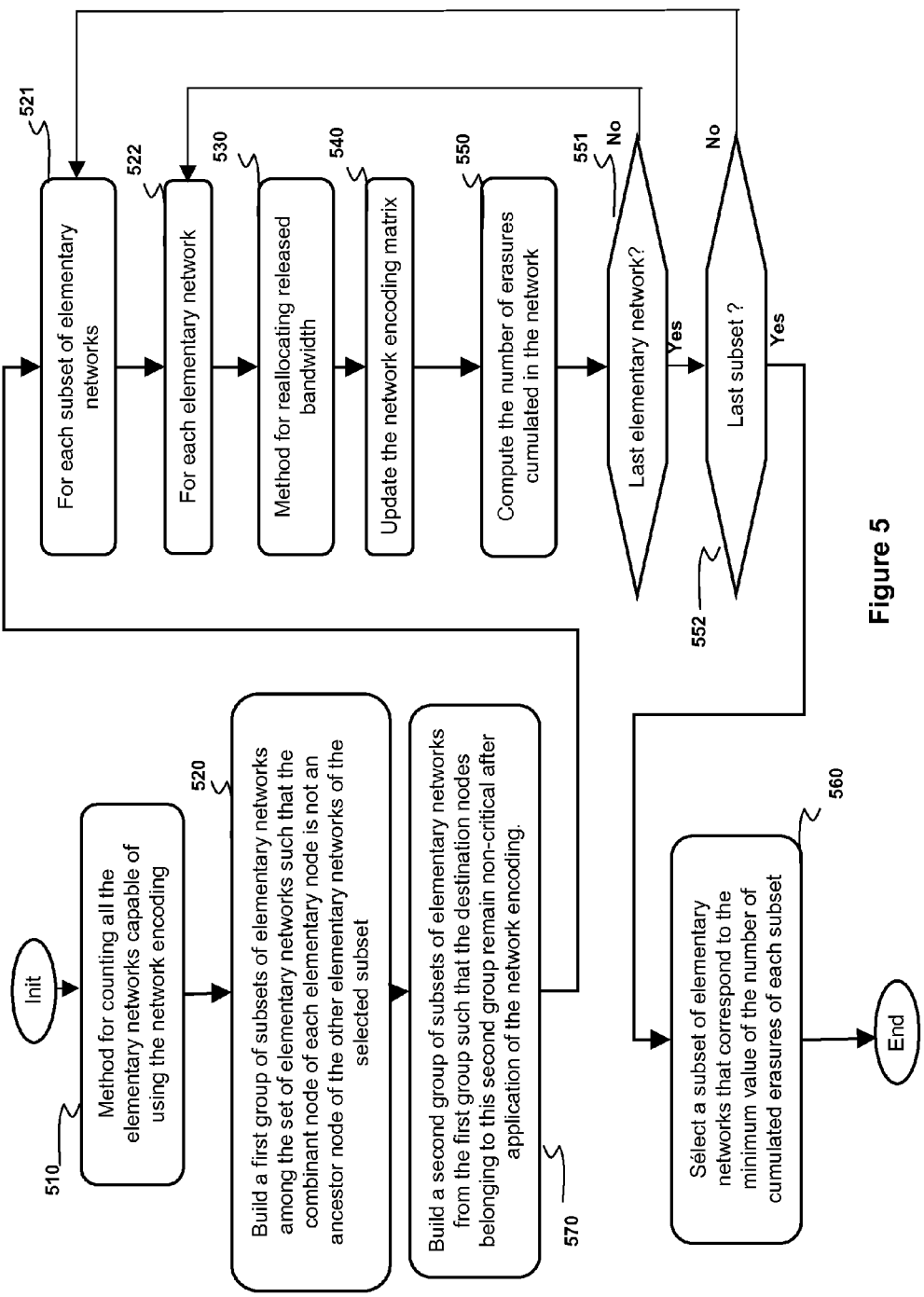
Figure 6:
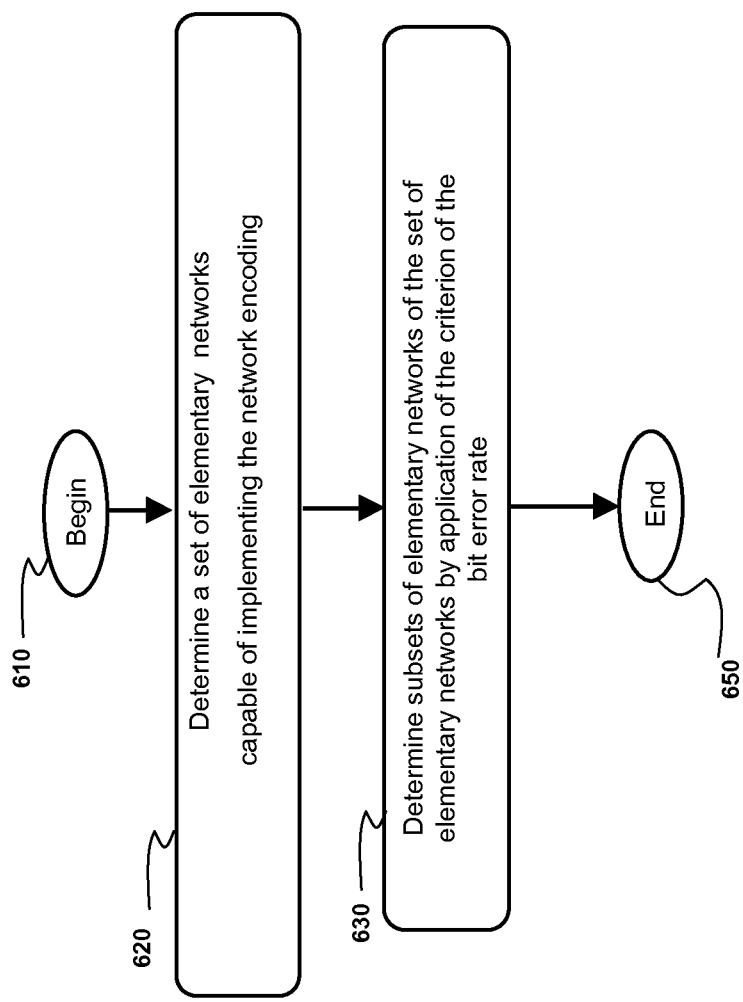
Figure 7:
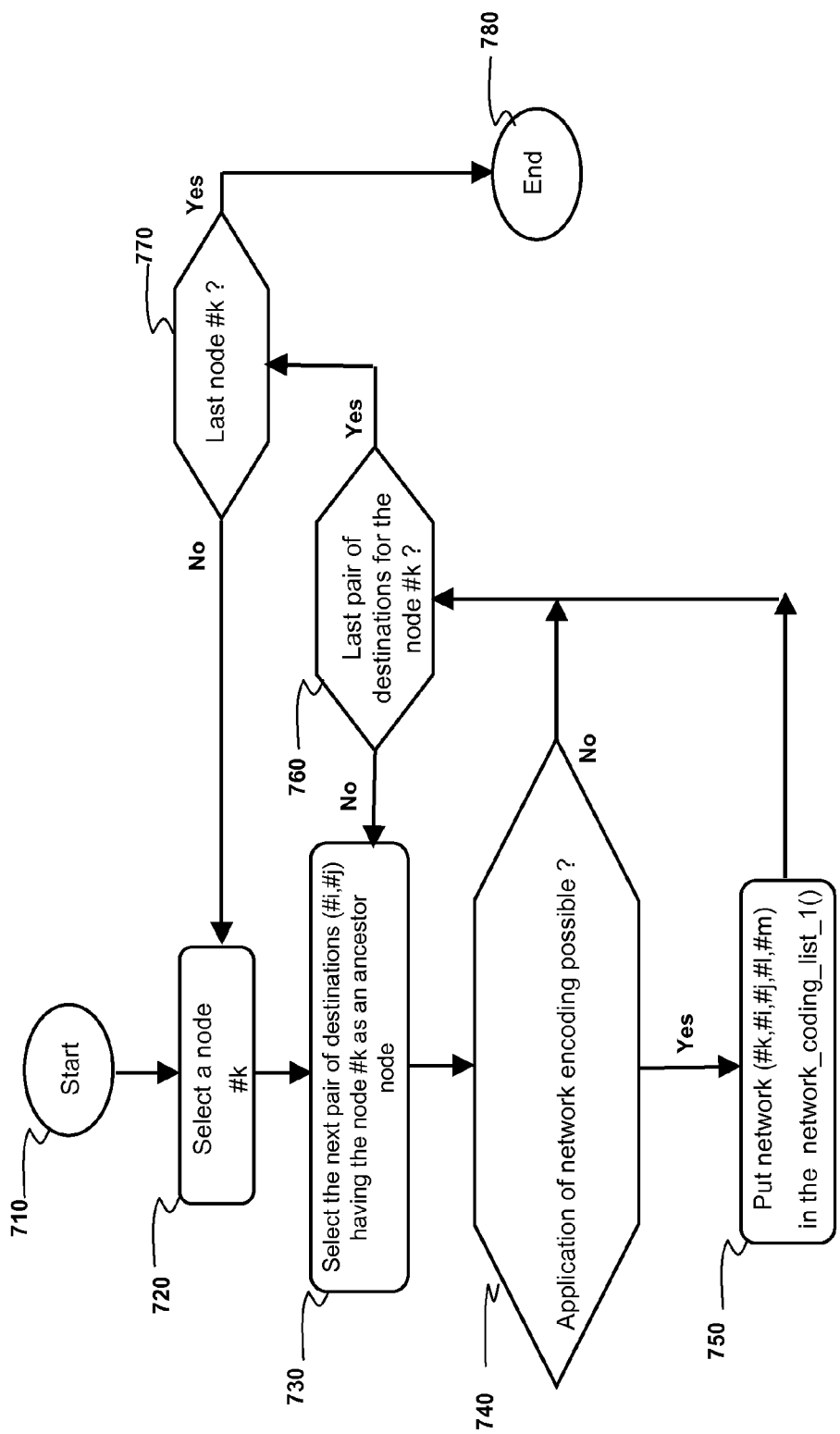
Figure 8:
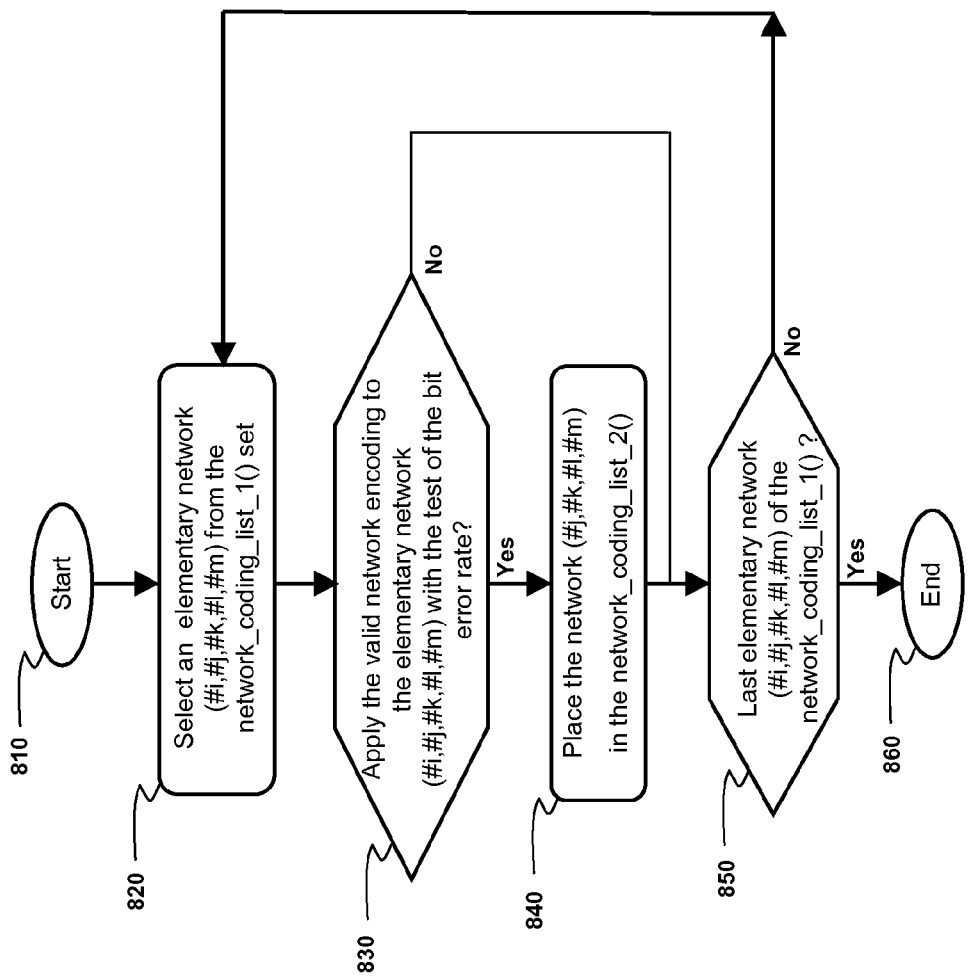
Figure 9:
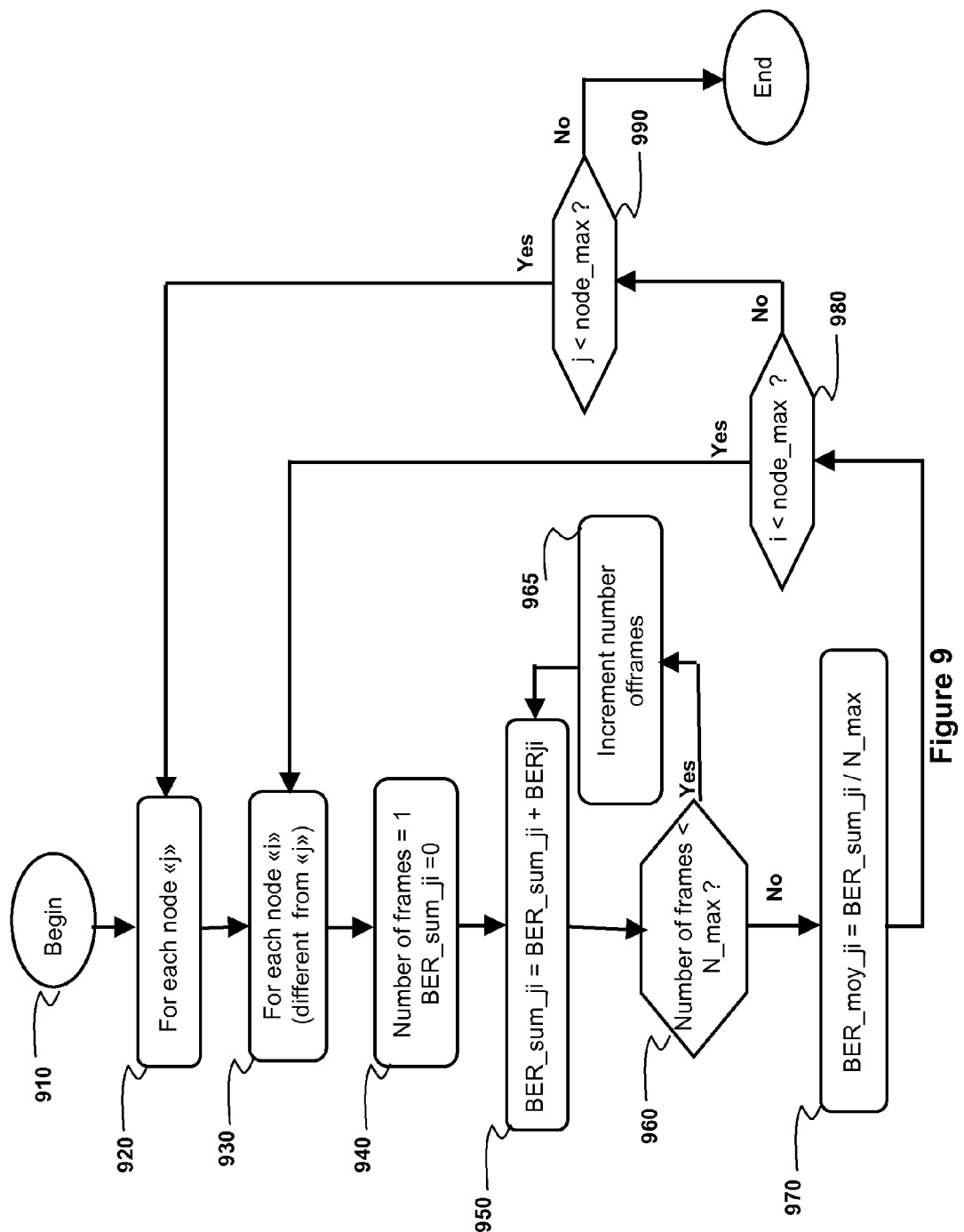
Figure 10:
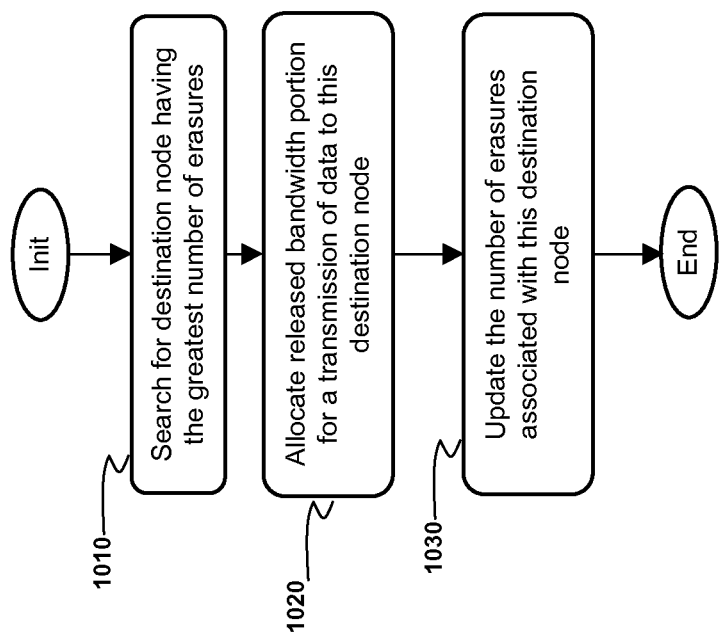
Figure 11:
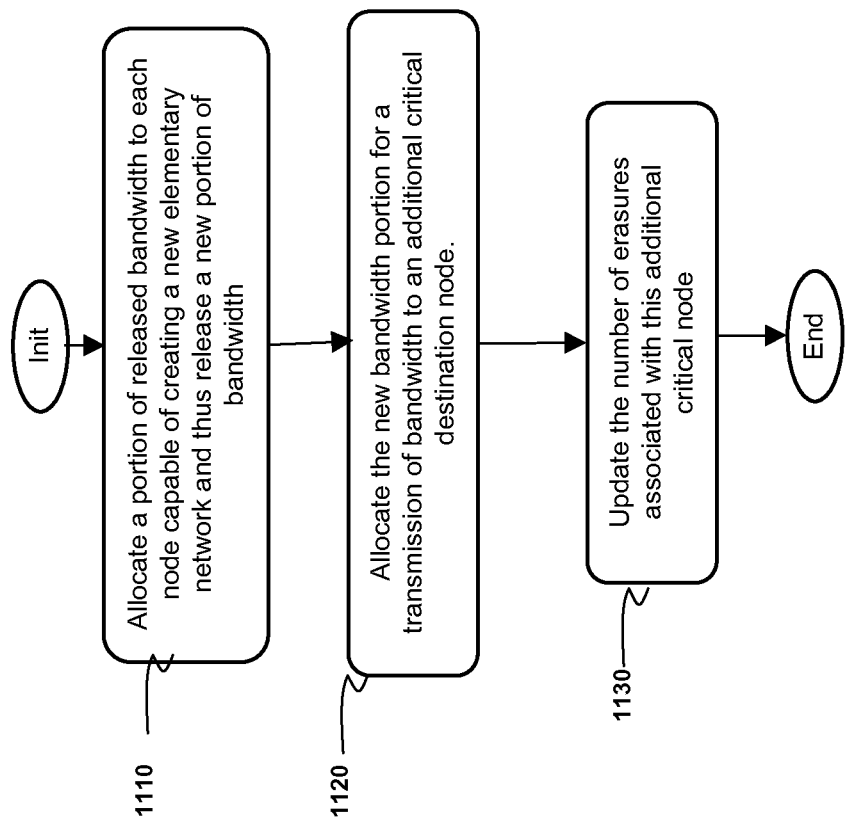
Figure 12:
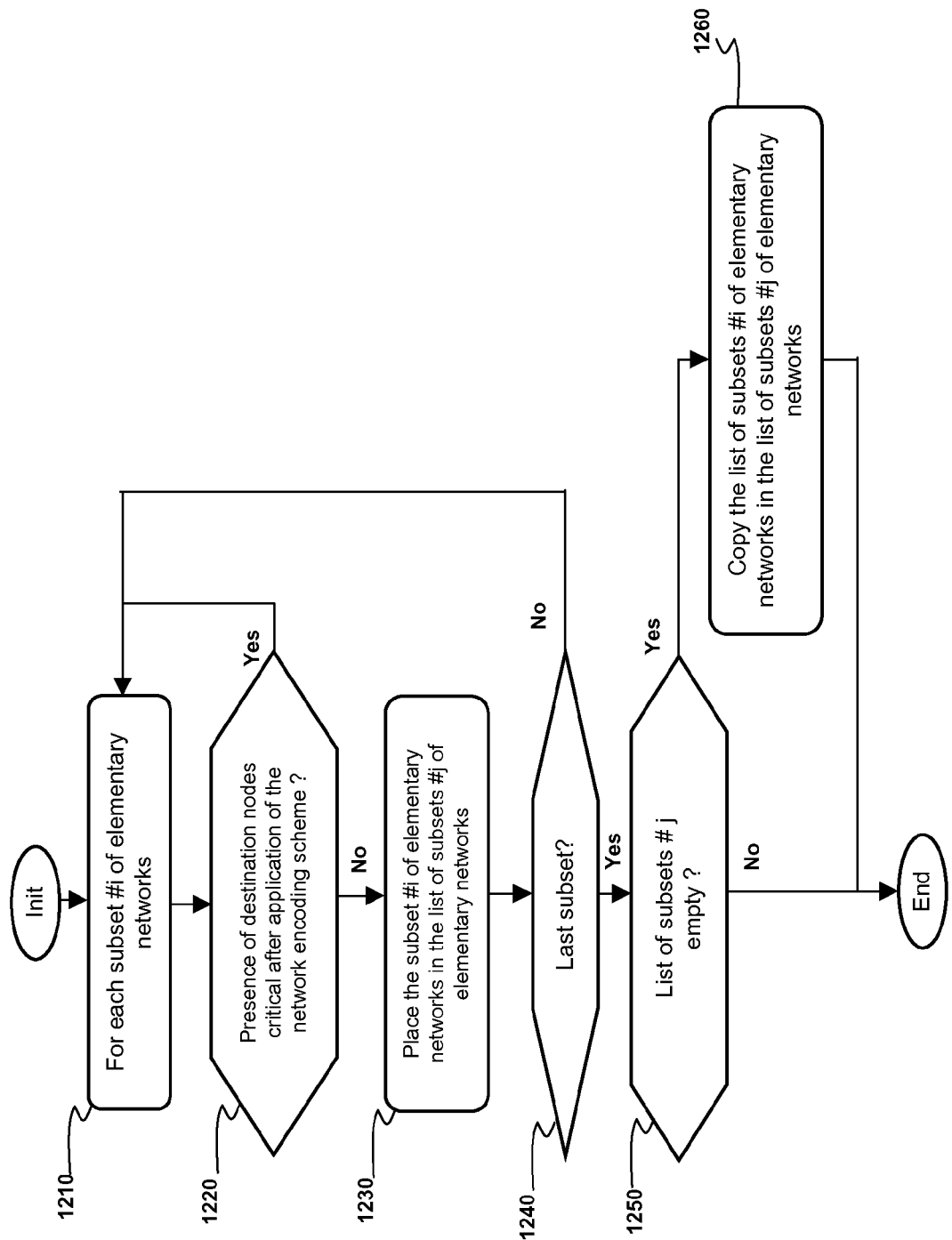

FIG. 5 provides a schematic illustration of an algorithm of a particular embodiment of the bandwidth allocation method using network encoding according to a particular embodiment of the invention;

FIG. 6 provides a schematic illustration of an algorithm of an embodiment of the method for determining the set of elementary networks capable of applying the network encoding;

FIG. 7 provides a schematic illustration of an algorithm for determining the set of elementary networks capable of implementing the network encoding described with reference to FIG. 6 according to a particular embodiment of the invention;

FIG. 8 provides a schematic illustration of an algorithm for selecting a subset of elementary networks determined by applying the criterion of the bit error rate as described in FIG. 6 according to one particular embodiment of the invention;

FIG. 9 provides a schematic illustration of a flowchart of a bit error rate estimation algorithm for estimating the bit error rate of a link between the source node and a destination node of FIG. 1, according to a particular embodiment of the invention;

FIG. 10 provides a schematic illustration of an algorithm of a particular embodiment of the method for allocating released bandwidth based on the search for the destination node possessing the highest bit error rate;

FIG. 11 provides a schematic illustration of a particular embodiment of the released bandwidth allocation method based on the fact that this allocation would enable the creation of a new elementary network not already listed and meeting the network encoding criterion;

FIG. 12 provides a schematic illustration of an alternative embodiment of the choice of the destination node for the assignment of released bandwidth.

6. DETAILED DESCRIPTION OF ILLUSTRATIVE EMBODIMENTS

We shall strive more particularly in the rest of this document to describe the problems and issues that have been confronted by the inventors as regards the allocation of released bandwidth during the application of a network encoding scheme. This set of problems and issues pertains to the field of meshed wireless communications networks where each node synchronously transfers data proper to each destination to the other nodes of the network.

Referring to FIG. 1 we present an example of a wireless mesh network in which it is possible to implement the technique for allocating bandwidth released by application of network encoding according to a particular embodiment of the invention.

In this example of a wireless mesh network, each node synchronously transfers data proper to each destination node to the other nodes of the network.

To illustrate this case, we shall consider here below in the description a synchronous 60 GHz communications network constituted by nine transmission nodes, each of which implements the device described here below with reference to FIG. 3.

Thus, each of the nodes 1a, 2a, 3a, 4a, 5a, 6a, 7a, 8a and 9a integrates a synchronous communications module (SCM) respectively 1, 2, 3, 4, 5, 6, 7, 8, 9 which integrates the different means used to execute the network encoding method according to the invention.

More particularly, the network comprises:

eight WAR (Wireless Audio Renderer) type nodes 1a, 2a, 3a, 4a, 6a, 7a, 8a and 9a, each of which is equipped with digital audio channel amplifier or renderer means, respectively 1b, 2b, 3b, 4b, 6b, 7b, 8b and 9b, each integrating a speaker;

one WAD (Wireless Audio Decoder) type node 5a comprising a multi-channel audio decoder known as a Surround Sound Decoder (SSD) 5b respectively, for example integrated into a flat screen and capable of transmitting on the different audio channels associated with the video displayed on the screen through the 60 GHz communications network in a perfectly synchronized way.

Figure 4:
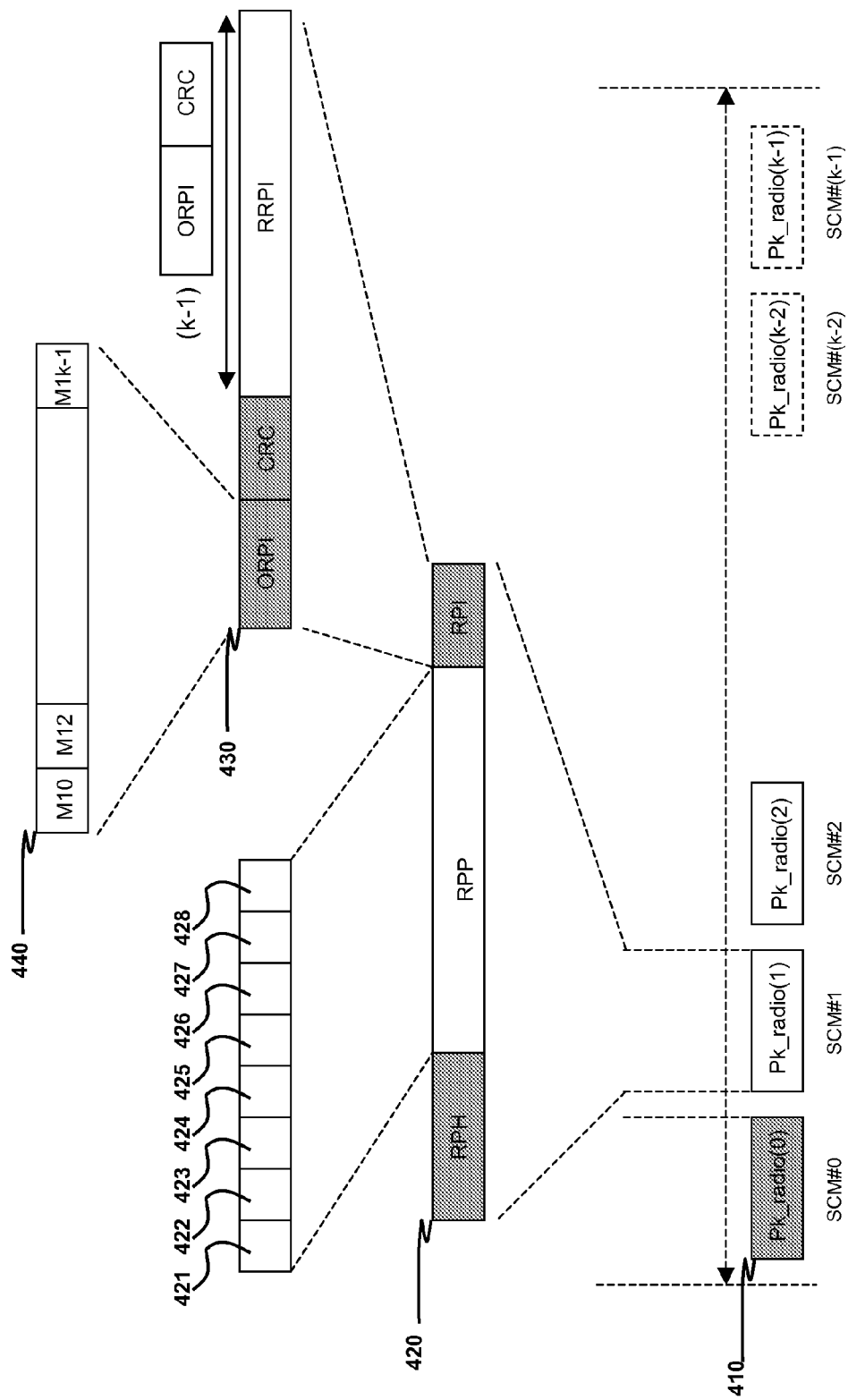
FIG. 4 shows the structure of a data super-frame transmitted within the network of FIG. 1, according to a particular embodiment of the invention, and makes it possible to explain a mechanism for broadcasting information on SNR measurements.

This communications network enables the WAD node to send the different WAR nodes information on the different audio channels using data transmission organized as shown in FIG. 4 described here below.

Figure 3:
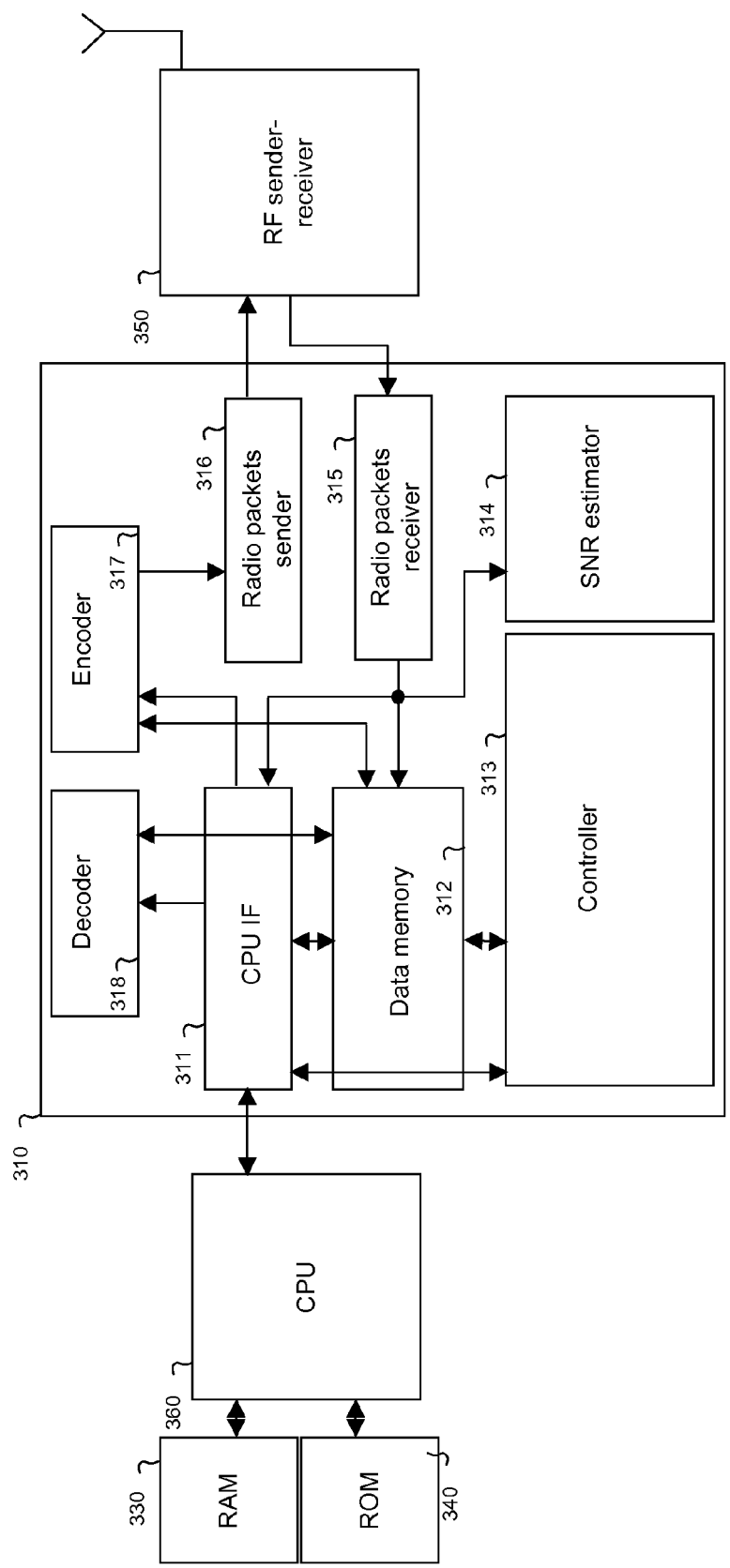
FIG. 3 is a schematic view illustrating a device implementing the bandwidth allocation method according to the particular embodiment of the invention.

FIG. 3 is a schematic view illustrating a device implementing the method for allocating resources according to a particular embodiment of the invention.

This device illustrates only one particular way, among several possible ways, for applying the various algorithms described in detail here above. Indeed, the technique of the invention can be applied in any manner, whether as a program executed by a reprogrammable computing machine (a computer, a digital signal processor or else a microcontroller) or on a dedicated computing machine (such as for example a set of logic gates such as an FPGA (field programmable gate array) or an ASIC (applications specific integrated circuit)).

The transmission device comprises the following elements:
- a RAM (random-access memory) execution memory block 330;
- a ROM (read-only memory) non-volatile memory block 340;
- a CPU (central processing unit) 360;
- a radio-frequency transceiver module 350 to send and receive data through the transmission medium;
- a processing module 310 that communicates with the CPU 360 and the radio-frequency transceiver module 350.

Furthermore, according to the particular embodiment of the invention, the processing module 310 comprises especially:
- a CPU interface module (CPU IF) 311 which corresponds to the interface between the CPU and the baseband part. The CPU interface module 311 manages especially data exchanges between the different blocks of the processing module 310 (described in detail here below) and the CPU 360;
- a memory 312 for the storage especially of retransmission tables;
- an encoder 317 and a decoder 318, for example of the Reed-Solomon type;
- an estimator 314 of the signal-to-noise ratio or SNR, the estimator being necessary for the mechanism for computing the bit error rates of the paths;
- a controller 313 that executes the steps of FIGS. 5 to 11, according to a particular embodiment of the method of the present invention.

Figure 2:
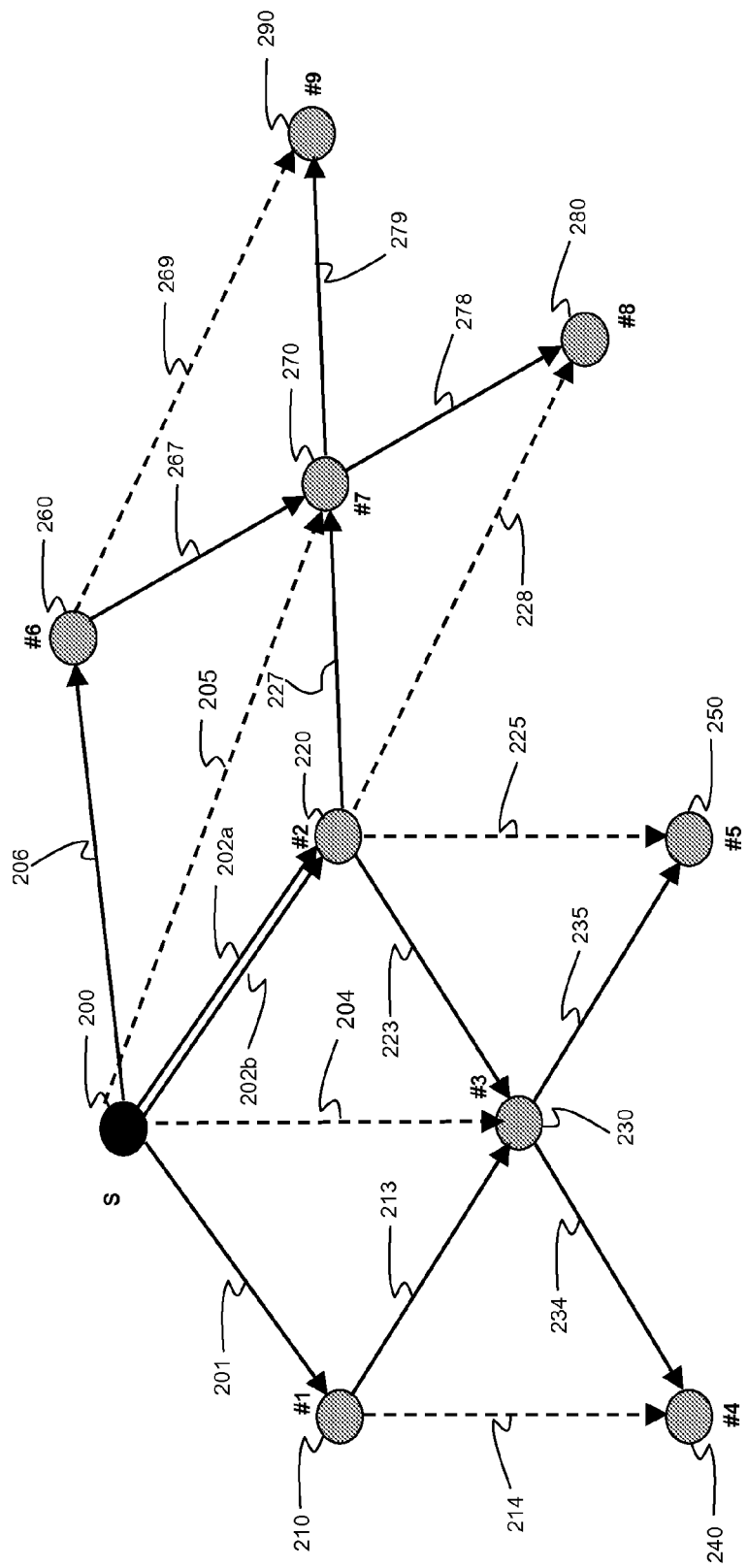
FIG. 2 is a schematic view of a second meshed network that can be used to illustrate an example of an implementation for a network encoding of the bandwidth allocation method according to one particular embodiment of the invention.

FIG. 4 shows the structure of a data super-frame transmitted within the network of FIG. 1 according to a particular embodiment of the invention. This FIG. 2 provides information on the structure of the packets and can also be used to explain a method for broadcasting information on SNR measurements.

During a synchronous data transmission cycle (SDTC), each synchronous communications module SCM#i (here below also called a node SCM#i) i identifying the index of the node integrating this module, transmits a radio packet (also called a frame) "Pk_radio" 210. The set of packets transmitted during an SDTC cycle forms a super-frame.

A radio packet (the detailed structure of which is referenced 420) consists of three data fields:
- a RPH (Radio Packet Header) field used for example to identify the number of super-frames sent since the system was put into operation (one super-frame per STDC cycle) as well as an identifier of the radio packet sent;
- an RPP (Radio Packet Payload) field used in an audio application to transmit data corresponding to the digital channels of each WAR node (channels referenced 221 to 228 respectively for the nodes 1a, 2a, 3a, 4a, 5a, 6a, 7a, 8a and 9a);
- an RPI (Radio Packet Information) field 430 enabling the broadcasting of information on measurements of quality of the radio links between nodes of the network. Each measurement received corresponds for example to a measurement of the SNR (signal to noise ratio) made by an SCM#i receiver node during the sending of a radio packet by another SCM#j node.

More specifically, the RPI field 430 consists of:
- an ORPI (Original Radio Packet Information) sub-field 440 corresponding to information on SNR measurements made by the SCM#i node during the previous radio packet transmissions by the other SCM#x nodes of the network. The (k−1) measurements are denoted as $M_{i,j}$ where the index i identifies the node that has made the measurement (SCM#1 in the example of FIG. 4) and the index j identifies the node relative to which this measurement is made (node SCM#2 for $M_{1,2}$, SCM#k for $M_{1,k}$);
- a CRC (cyclic redundancy check) sub-field for protecting the data of the ORPI sub-field enabling the node that receives the information to make sure that the information has not been corrupted by disturbances related to the radio channel;
- an (RRPI or Relayed Radio Packet Information) sub-field for relaying data measured by the other nodes (the nodes other than SCM#1 in the example of FIG. 4) to ensure that all the nodes of the network receive information on the SNR measurements and do so even when there are fixed or temporary obstacles in the network. This RRPI sub-field consists of a concatenation of the (k−1) ORPI sub-fields and their associated CRC sub-fields received from the other nodes.

The ORPI and RRPI sub-fields are transmitted for each SCM#1 in a fixed order known to the other nodes of the system so that these nodes can identify the content of the information without additional information. The nodes will thus constitute a table containing the information on the SNR measured by the all the nodes of the network.

When relaying information, an SCM#1 node having received an erroneous ORPI sub-field (or an erroneous RRPI sub-field) from another SCM#j node (or an erroneous RRPI sub-field from another SCM node), can detect this erroneous field by using the associated CRC sub-field. By default, if the SCM#1 node has to relay information for an SCM#j node for which it does not have accurate information, it will place a piece of information, in the corresponding sub-field, indicating that the information is unavailable.

The SNR is measured for each data packet received. The SNR can be measured at the radio level, for example with a measurement of RSSI (Received Signal Strength Indication) or else at the modulation level.

An SNR-measurement technique is presented in the U.S. patent application 2002/0041640A1. An estimation of the noise is obtained by adding up the measurements of the deviation of the power of each symbol received relative to a theoretical value. This value corresponds to the power of the symbol having the smallest distance from the received symbol. The result is divided by the number of symbols considered. This corresponds to the application of the criterion of maximum likelihood which likens a received symbol to its closest neighbor in terms of distance. The formula (1) thus obtained is the following.

$$B = \frac{\sum_{i=1}^{k} \min_i [(S_i^* - S_i)^2]}{k} \quad (1)$$

where i is an integer; k designates the number of symbols per data packet; min designates the smallest Euclidean distance between a received symbol and a theoretical point of the constellation of the modulation; $S_i^*$ designates the position of the received symbol and Si designates the position of the theoretical symbol.

With this computation of the noise of the channel, after reception of a data packet, the signal-to-noise ratio SNR can be estimated by dividing the mean power per symbol by the power of the noise computed according to the previous equation (1). The formula (2) giving the signal-to-noise ratio SNR of a data packet is written as follows:

$$SNR = \frac{\sum_{i=1}^{k} (S_i^*)^2}{B \cdot k} \quad (2)$$

Once the SNR has been measured, the bit error rate (BER) can be deduced, the modulation used being known. A modulation curve that links the BER and the SNR must be known by all the nodes to deduce the values of the bit error rates at each measurement of SNR.

FIG. 5 provides a schematic illustration according to a particular embodiment of the invention of a method for allocating resources (or more particularly bandwidth portions) released during the application of network encoding to a subset of elementary networks (one example of network encoding is described more amply here below with reference to FIG. 2).

After initialization, a step 510 is used to determine a set of elementary networks of nodes capable of applying network encoding in the communications network. This step 510 is more amply described here below with reference to FIG. 6.

Then a step 520 is executed. This step 520 is used to build a group bringing together all the subsets #i of elementary networks in the communications network such that the combinant node of each elementary network is not an ancestor node of the other elementary networks of the subset #i. Thus, the elementary networks of a subset can each simultaneously implement an elementary network encoding scheme, each elementary network making it possible, by application of an elementary network encoding scheme, to release a portion of bandwidth which could serve for transmitting at least one data unit.

In one variant, the step 520 is followed by a step 570. This step 570 is used to sort out and preferably select the subsets #i listed during the step 520. This step 570 is more amply described with reference to FIG. 12.

Thus, for each subset #i of elementary networks in the communications network (step 1210), a check is made to see if there is at least one destination node of a sub-network belonging to this subset #i that is critical or becomes critical after application of the network encoding scheme (step 1220).

A destination node is said to be critical when it has been unable to accurately decode at least one data unit received. More specifically, a destination node is said to be critical if a value of a criterion of quality of decoding of said destination node is above a predetermined threshold of accurate decoding of a data unit, said threshold indicating a minimum decoding quality. The value of a criterion of quality of decoding corresponds for example to a computation of a bit error rate or a computation of a symbol erasure rate.

A destination node may also become critical after application of the network encoding. Indeed, before application of the network encoding, the bit error rate of a data unit at the level of the destination node depends solely on the set of bit error rates of the links (preferably direct links) between the nodes situated on the path traversed by said data unit. After application of the network encoding, the bit error rate of the data unit at the destination node depends furthermore on the set of bit error rates of the data units combined with the data unit during the application of the network encoding.

If a subset #i comprises an elementary network containing at least one such destination node, it will not be chosen initially. If not, this subset #i will be put into a second group of subsets of #j which will be used thereafter to allocate bandwidth portions. If at the end of the analysis of the subsets #i, the group of subsets #j remains empty, the group of subsets #i becomes the group of subsets #j (step 1260). This variant of implementation enables a pre-selection of the possible subsets of the elementary networks and thus reduces computation time.

An example of implementation is described more amply here below with reference to FIG. 2.

Once the step 520 has been executed (or after the step 570 when the variant of step 570 is executed), steps 521 to 552 for allocating bandwidth portions are then executed if several subsets of elementary networks are detected.

A step 521 is used to select the subset of elementary networks #i in the first group (at the end of the step 520) or in the second group (at the end of the step 570).

Then, in the selected subset, a step 522 is used to select an elementary network among the elementary networks of said subset selected.

Then, a step 520 implements the method for allocating the released bandwidth portion released by application of an elementary network encoding scheme of the selected elementary network (step 522) of said selected subset (step 521), for a transmission of data units to at least one critical destination node (this notion is more amply described here below) in the communications network.

Thereafter, FIGS. 10 and 11 illustrate two embodiments of such an allocation method.

A following step 540 updates the encoding matrix of the network.

Then, and solely in the case where there would be several subsets of elementary networks possible during the execution of the steps 510 and 520, a step 550 (more amply described here below) is used to take stock of a value of a criterion of decoding quality, for example the number of maximum erasures (NbrEffi), directly correlated with the bit error rate (BER), for each destination node. Indeed, owing to the nature of the modulation used, the number of erasures of a destination node is directly related to the bit error rate of this destination node. Thus enables the defining of a value of a overall criterion of decoding quality, for example a number of total erasures of destination nodes for each subset.

A following step 551 is used to determine whether this is the last elementary network of the subset of elementary networks analyzed.

If not, the steps 522 to 550 are repeated.

If the answer is yes, a step 552 is used to ascertain that it is the last subset of elementary networks to be analyzed, should there be several subsets of elementary networks possible during the execution of the steps 510 and 520.

If this is not the case, the steps 521 to 551 are repeated.

If this is the case, a step 560 is used to select a single subset of elementary networks according to a criterion more amply described here below.

FIG. 6 provides a schematic illustration of an algorithm of one embodiment of the method for determining the set of elementary networks (step 510 of FIG. 5) capable of applying a network encoding. This determining method is used to determine nodes involved in the network encoding, starting from a given configuration of the network.

After a starting step 610, the operation passes to a step 620 (described in detail here below with reference to FIG. 7) in which one embodiment of the invention determines a set of elementary networks which can implement a network encoding, here below called elementary network encoding.

At the end of this step 620, all the nodes will have available a same list containing the identifiers of the destination nodes and of the relay nodes which can implement the network encoding.

Then, the operation passes to a step 630 (described in detail here below with reference to FIG. 8), in which we select a subset of the set of elementary networks determined at the step 620, in applying the bit error rate criterion (described more amply with reference to FIG. 9).

According to one embodiment of the invention, such elementary networks of said subset can simultaneously each implement an elementary network encoding scheme, each elementary network making it possible, by application of an elementary network encoding scheme, to release a portion of bandwidth that can serve for transmitting at least one data unit.

FIG. 7 presents a flowchart providing a detailed description of a particular embodiment of the step 620 of FIG. 6 for determining a set of elementary networks available in the network.

After a starting step 710, the operation passes to a step 720 in which each relay node of the network (relay node #k) is selected.

Once this relay node has been selected, in a step 730, a pair of direct descendant nodes (nodes #i and #j) of the selected relay node is selected from among the direct descendant couples of the selected relay node.

Then, in a step 740, a test is made to ascertain the possibility of applying an elementary network encoding scheme to the elementary network comprising the selected relay node (node #k) and the pair of direct descendant nodes (nodes #i and #j).

The network encoding is validated by ensuring that the node #i (and #j respectively) can receive the data addressed to #j (and #i respectively) through an ascendant node or ancestor node #l (respectively #m).

The test is deemed to be positive (with the possibility of applying the network encoding) if the direct descendant node #i (and #j respectively) can receive the data addressed to the direct descendant #j (and #i respectively) through a direct ancestor node #l (and #m respectively) of the direct descendant node #i. (See here below definitions of the terms "direct descendant node" and "direct ancestor node").

Thus, it is ensured that the elementary network comprising the nodes #k, #i, #j, #l and #m is such that:
the combinant relay node #k makes it possible to obtain a resultant packet by combining, according to an elementary network encoding scheme, two data packets which it receives and of which one is intended for the direct descendant node #i and the other for the direct descendant node #j;
the direct ancestor node #l (and #m respectively) of the direct descendant node #i (and #j respectively) is used to send the direct descendant node #i (and #j respectively) the copy of the data packet intended for the direct descendant node #j (and #i respectively).

The direct descendant node #i (and #j respectively) can retrieve the data packet intended for it from the resultant packet and from the copy of the data packet intended for the direct descendant node #j (#i respectively).

The above reasoning can of course be extended to the case where the elementary network has two direct descendant nodes.

As for the adjective "direct" used to qualify the issue or ancestry of certain nodes, it must be noted that:
a first node is a direct descendant node of a second node if the first node can receive a packet transmitted by the second node without this packet being relayed by a third node;
a first node is a direct ancestor node of a second node if the second node can receive a packet transmitted by the first node without this packet being relayed by the third node.

If the test of the step 740 is positive, then a step 750 places the elementary network in question in a first list "network_coding_list_1( )".

Then the operation passes to a step 760 which is more amply described here below.

If the test of the step 740 is negative, the operation passes directly to the step 760 for selecting the next elementary network.

At the step 760, a test is made to see if the pairs of direct descendant nodes for the selected relay node have already been selected (at the step 730).

If the test of the step 760 is negative, the operation passes to the step 730 for selecting a new pair of direct descendant nodes.

If the test of the step 760 is positive, the operation passes to a step 770 in which a test is made to see if all the relay nodes of the network have already been selected (at the step 720).

If the test of the step 770 is negative, the operation passes to the step 720 for selecting a new relay node.

If the test of the step 770 is positive, the operation passes to a final step 780.

FIG. 8 is a flowchart providing a detailed description of a particular embodiment of the step 630 of FIG. 6 for selecting a subset from the set of elementary networks determined at the step 620 and guaranteeing the application of the bit error rate criterion (this criterion is described here below in detail).

After a starting step 810, the operation passes to a step 820 in which an elementary network is selected from the first list "network_coding_list_1( )", then to a step 830 in which a test is made to see if the criterion of the bit error rate is met (for this selected elementary network).

If the criterion is met (the test of the step 830 is positive), the elementary network is added to a second list known as "network_coding_list_2( )".

Then, the operation passes to the step 850 in which a test is made to see if all the elementary networks of the first list "network_coding_list_1( )" have been selected (at the step 820).

If the test of the step 850 is negative, the operation passes to the step 820 to select a new elementary network.

If the test of the step 850 is positive, the operation passes to the final step 860.

If the criterion is not met (with the test of the step 830 being negative) a next elementary network of the list "network_coding_list_1( )" is selected after checking that there are remaining elementary networks to be analyzed (step 850).

FIG. 9 provides a schematic illustration of a flowchart of an algorithm for estimating the bit error rate of a link between a source node and a destination node of FIG. 1, according to a particular embodiment of the invention.

In the steps 910, 920, 930 and 940, the process for the link between the node #i and the node #j (where j is different from i) is initialized. A variable "Nb_frames" (used to count the number of frames processed) is set at 1 and a variable "BER_sum_ji" (used to compute a cumulative total of the bit error on several frames) is set at 0.

Each given node of the network computes the bit error rate for each packet (also called a frame) of each link between two nodes of the network, namely:
  for each packet of each link between the given node and another node, through a measurement of SNR made by the given node itself (this measurement of SNR is used to determine a bit error rate); and
  for each packet of each link between two other nodes, in retrieving the SNR measurement information obtained by means of the mechanism for broadcasting information on SNR measurements (a mechanism described here above with reference to FIG. 4). Each SNR measurement is used to determine a bit error rate.

Thus, in a step 950, for the link between the node #i and the node #j, the bit error rate BERji of the current frame is added together with the current value of the variable "BER_sum_ji".

In a step 960, a test is made to see if the number of frames already processed is smaller than N_MAX, with N_MAX being the total number of frames used to estimate the bit error rate of the link between two nodes.

If the number of processed frames is smaller than N_MAX, the estimation continues: the operation passes to the step 965 in which the variable "NB_frames" is incremented by one unit, and then the operation passes to the step 950 to process the next frame.

If not (i.e. if the number of processed frames is equal to N_MAX), the estimation comes to an end. The operation passes to the step 970 in which the mean value of the bit error rate for the link between the nodes #i and #j is computed:

$$BER\_moy\_ji = BER\_sum\_ji / N\_max$$

The steps 980 and 990 apply the test in order to scan the different links to be estimated (with "nodes_max" being the total number of nodes of the network).

FIG. 2 is a schematic view of a meshed network to provide an initial illustration of an example of an implementation of the determining of a subset of the set of elementary networks which can implement a network encoding (steps 510, 520) according to a particular embodiment of the invention.

This meshed network has a source node referenced 200 and called node S here below, which transmits packet streams to destination nodes referenced 240, 250, 280 and 290 and here below called destination nodes #4, #5, #8 and #9 respectively. It also includes nodes referenced 210, 220, 230, 260 and 270 and here below called relay nodes #1, #2, #3, #6 and #7 respectively, which relay the packets of the source node to the destination nodes following the paths 201, 202a, 202b, 206, 213, 223, 227, 234, 235, 267, 278 and 279 (these paths are depicted in unbroken lines in FIG. 2).

In this second network, for example the following complete paths are used:
  from the source node up to the destination node #4: S→#2→#3→#4;
  from the source node up to the destination node #5: S→#1→#3→#5;
  from the source node up to the destination node #8: S→#6→#7→#8;
  from the source node up to the destination node #9: S→#2→#7→#9.

Applying the step 620 of FIG. 6, we obtained the following three elementary networks:
  first elementary network:
    combinant relay node: node #3 which implements a network encoding by applying an EXCLUSIVE OR (XOR) operation to the data intended for the nodes #4 and #5;
    direct descendant nodes: nodes #4 and #5. It is assumed that the nodes #4 and #5 are respectively within range of the nodes #1 and #2. Thus, the node #4 and the node #5 respectively can listen opportunistically to the data element intended for the node #5 through the path 214 and the node #4 through the path 225;
    direct ancestor nodes: nodes #1 and #2;
  second elementary network:
    combinant relay node: node #7, which implements a network encoding by applying an EXCLUSIVE OR (XOR) operation to the data intended for the nodes #8 and #9;
    direct descendant nodes: nodes #8 and #9. It is assumed that the nodes #8 and #9 are respectively within range of the nodes #2 and #6. Thus, the node #8 and the node #9 respectively can listen opportunistically to the data element intended for the node #9 through the path 228 and the node #8 respectively through the path 269;
    direct ancestor nodes: nodes #2 and #6;
  third elementary network:
    combinant relay node: node #2 which implements a network encoding by applying an EXCLUSIVE OR (XOR) operation to the data intended for the nodes #3 and #7;
    direct descendant nodes: nodes #3 and #7. It is assumed that the nodes #3 and #7 are respectively within range of the nodes S. Thus, the node #3 and the node #7 respectively can listen opportunistically to the data element intended for the node #7 through the path 214 and the node #3 through the path 205 respectively;
    direct ancestor node: node S (same direct ancestor for the nodes #3 and #7).

Referring now to the example of FIG. 2, we present an example of implementation of the step 630 of FIG. 6. An explanation is provided of the criterion of the bit error rate (BER) used to select a subset of the set of elementary networks determined at the step 620. This criterion is used to guarantee the quality of service at the level of the destination nodes after the network decoding.

In the following description, a test is made to find out if the first elementary network (the one whose combinant relay node is the node #3) verifies the criterion of the bit error rate.

Those skilled in the art will easily be able to transpose this description to the test to be made for the second and third elementary networks (for which the combinant relay nodes are respectively the node #7 and the node #2).

The node #3 can apply the network encoding if the bit error rate after network decoding is below a preset threshold. The bit error rate after network decoding is computed as described here below (see FIG. 8 for an example of an algorithm for estimating the bit error rate of a link between two nodes).

The node #3 retrieves the data coming from the nodes #1 and #2. Their bit error rate will be the following:
  BER_S3_4=BER_S2*(1−BER_23)+BER_23*(1−BER_S2), where:
    BER_S3_4 is the bit error rate between the nodes S and #3 through the node #2;
    BER_S2 is the bit error rate between the nodes S and #2;
    BER_23 is the bit error rate between the nodes #2 and #3;

$BER\_S3\_5 = BER\_S1*(1-BER\_13)+BER\_13*(1-BER\_S1)$, where:

BER_S3_5 is the bit error rate between the nodes S and #3 through the node #1;
BER_S1 is the bit error rate between the nodes S and #1;
BER_13 is the bit error rate between the nodes #1 and #3;

The node #3 applies the network encoding to the two packets of data received with the XOR operation. The bit error rate after network encoding by the node #3 is:

$BER\_S3\_NC = BER\_S3\_4*(1-BER\_S3\_5)+BER\_S3\_5*(1-BER\_S3\_4)$. The nodes #4 and #5 simultaneously receive the encoding packet (network encoding) with the following bit error rates (BER_S4_NC for the node #4 and BER_S5_NC for the node #5):

$BER\_S4\_NC = BER\_S3\_NC*(1-BER\_34)+BER\_34*(1-BER\_S3\_NC)$;
$BER\_S5\_NC = BER\_S3\_NC*(1-BER\_35)+BER\_35*(1-BER\_S3\_NC)$ where BER_34 is the bit error rate between the nodes #3 and #4;
BER_35 is the bit error rate between the nodes #3 and #5;

The nodes #4 and #5 carry out network decoding by using data packets whose copies have the following bit error rates (with BER_S4_1 being the bit error rate for the copy received by the node #4 and coming from the node S through the node #1, and BER_S5_2 being the bit error rate for the copy received by the node #5 and coming from the node S through the node #2):

$BER\_S4\_1 = BER\_S1*(1-BER\_14)+BER\_14*(1-BER\_S1)$;
$BER\_S5\_2 = BER\_S2*(1-BER\_25)+BER\_25*(1-BER\_S2)$ where:

BER_14 is the bit error rate between the nodes #1 and #4;
BER_25 is the bit error rate between the nodes #2 and #5;

The bit error rates after network decoding by the nodes #4 and #5 are given as follows (with BER_S4_ND being the bit error rate after network decoding by the node #4 and BER_S5_ND being the bit error rate after network decoding by the node #5):

$BER\_S4\_ND = BER\_S4\_NC*(1-BER\_S4\_1)+BER\_S4\_1*(1-BER\_S4\_NC)$;
$BER\_S5\_ND = BER\_S5\_NC*(1-BER\_S5\_2)+BER\_S5\_2*(1-BER\_S5\_NC)$.

The increase in the bit error rate after application of network encoding can be determined by comparing, for example, the value BER_S4_ND with the bit error rate without application of network encoding BER_S4 for a data unit travelling between the nodes #S and #4 in passing through the nodes #2 and #3. This bit error rate BER_S4 is then determined according to the value:

$$BER\_S4 = BER\_S3\_4*(1-BER\_34)+BER\_34*(1-BER\_S3\_4)$$

Finally, the node #3 can apply the network encoding if the following inequalities are met:

BER_S4_ND<threshold;
BER_S5_ND<threshold, with "threshold" being a predetermined threshold.

Referring now to FIG. 2, we present an example of an implementation of the step 520 of FIG. 5.

It is assumed that the three elementary networks determined at the step 620 (the combinant relay nodes of which are respectively the nodes #3, #7 and #2) verify the criterion of the bit error rate. In other words, it is assumed that at the end of the step 630, the network_encoding_list_2( ) includes the three elementary networks mentioned here above.

It may be recalled that in the step 520 the final list, namely the network_coding_list_3( ) of elementary networks, is drawn up such that the combinant relay node of an elementary network of a subset cannot be the direct ancestor node of another elementary node of this same subset.

In the example of FIG. 2, for the list called network_coding_list_3( ) resulting from the application of the step 520, one possible subset is the association of two elementary networks for which the combinant relay nodes are respectively the nodes #3 and #7. Indeed, the elementary network for which the combinant relay node is the node #2 cannot be chosen because the node #2 is a direct ancestor node of the elementary network for which the combinant relay node is the node #3. As it happens, if the node #2 were to apply the network encoding for the direct ancestor nodes #3 and #7 (elementary network for which the combinant relay node would be the node #2), the node #5 could not receive, through the link 225, the data that the node #2 transmits to the node #3 (intended for the node #4) and which is needed by the node #5 to carry out the network decoding (in the elementary network for which the combinant relay node is a node #3). In other words, the link 225 would be unexploitable.

If several subsets of elementary networks are possible during the execution of the step 620, the step 520 memorizes all the possible subsets to then test each subset during the execution of the steps 521 to 552 described in greater detail here below.

FIG. 10 provides a schematic illustration of an algorithm of a particular embodiment of the invention for optimizing the use of released bandwidth portions (step 530 of FIG. 5) by application of an elementary network encoding scheme in each of the elementary networks of a subset, for a transmission of data units to at least one destination unit called a critical unit.

When the algorithm is initialized, there is available at least one bandwidth portion (corresponding for example to a time slot in the case of a wireless communications network implementing an SDTC cycle) released during the application of the network encoding for each elementary network of said subset selected during the step 520. Each elementary network comprises at least one source node S, one relay node #k and at least two destination nodes #i and #j.

By using the values BER_Sx_ND obtained during the applications test for the network encoding performed during the step 630 of FIG. 6, it is possible in a step 1010 to determine those nodes which are the critical destination nodes, i.e. those which have the greatest need of additional copies to improve their bit error rate.

Another embodiment of the present invention would be one in which a selection would be made of the critical destination nodes which, after allocation of the released slot would become non-critical nodes.

Yet another embodiment of the present invention would be one in which a selection would be made of the critical destination nodes that are closest to the threshold of non-criticality after assignment of the released slot.

Then, a step 1020 enables the allocation of the released bandwidth portions by application of said elementary network encoding system in each of the elementary networks of said subset for a transmission of data units to at least one critical destination node.

The node which will be responsible for transmitting data units to this preliminarily chosen critical destination node could be chosen from among the set of nodes of the network and must comply with the following criteria:

this node possesses information intended for the chosen critical destination node;

this node possesses a link with a chosen critical destination node;

finally, this node could use different methods of transmission to improve the decoding capacity of the critical destination node.

Since the network is of the TDMA type, the position of the released slot has little importance. However, for a determined TDMA transmission sequence, the speech time (slot) of the chosen node must follow the speech time (slot) of the data unit source node.

According to one particular embodiment of the invention, the link between the chosen node and the preliminarily chosen critical node is direct.

However, according to another particular embodiment of the invention, this link may be indirect, i.e. one or more nodes will be responsible for relaying the data unit transmitted by the chosen node to the critical destination node. This embodiment thus uses more released slots relative to the mode using a direct link but nevertheless improves the capacity for decoding an imposed critical destination node.

The capacity for decoding at the level of a destination node may be improved according to a mode of action by the sending of additional copies of the data units to the destination unit when this destination unit uses a decoding with numerous copies.

In one alternative embodiment, the released bandwidth portions are used to increase the robustness of encoding, i.e. to enable the release of a code having an augmented redundancy and thus enabling more errors to be corrected. The improvement of the decoding capacity changes a critical destination node into a non-critical destination node.

The bit error rate or BER_Sj_ND of each critical destination node is then updated during a step 1030 (when the critical destination node is the node #j).

One variant of this method could be the fact of choosing, from a plurality of critical destination nodes, a critical destination node which, thanks to the contribution of this new data copy provided by this released bandwidth portion, would pass above the decoding threshold. Indeed, a piece of data is considered to be correct and decodable as of the instant when the bit error rate associated with this destination node is above a predefined decoding threshold. It can then be judicious to preferably select the destination nodes for which the bit error rate would be greater than the decoding threshold.

For example, a first step consists in determining the critical destination nodes that might become non-critical through the allocation of said released bandwidth portion and then by selecting one of them to perform the following steps:

estimating, for each previously determined critical destination nodes, a first and second value of said criterion of quality of decoding respectively without and with allocation of the first released bandwidth portion;

determining, for each previously determined critical destination node, the difference between said first and second estimated values;

selecting, from among the previously determined critical destination nodes, the destination node for which the difference between said and first values is the greatest.

According to one advantageous characteristic, if no critical destination node should become non-critical and if this should be so even because of the allocation of said released bandwidth portion, the step for selecting a critical node comprises steps for:

estimating, for each critical destination node already listed during the step for determining at least one critical destination node in a communications network, a first and a second value of said criterion of decoding quality, respectively without and with the allocation of said released bandwidth portion;

determining, for each critical destination node already listed during the step for determining at least one critical destination node in a communications network, the difference between said first and second estimated values;

selecting, from among the critical destination nodes already listed during the step for determining at least one critical destination node in the communications network, the destination node for which the difference between said first and second values is the greatest.

FIG. 11 schematically illustrates a particular embodiment of the method for allocating a released bandwidth portion based on the fact that this additional allocation would make it possible, during a step 1110, to create a new elementary network that has not already been listed and complies with the network encoding criterion.

As a reminder, the step 530 of FIG. 5 is used to allocate released bandwidth portions by application of an elementary network encoding scheme in each of the elementary networks of a subset for a transmission of data units to said at least one critical destination node.

According to a particular embodiment of the invention, for at least one released bandwidth portion, the step 530 comprises steps for:

creating an additional elementary network through the allocation of said released bandwidth portion, said additional elementary network belonging to said subset of elementary networks determined during the steps 510 and 520 and making it possible, by application of an elementary network encoding scheme, to release a portion of an additional bandwidth that can serve for the transmission of at least one data unit;

determining at least one additional critical destination node associated with said additional elementary network;

allocating, according to the already described step 530, said released additional bandwidth portion for transmitting data units to said at least one additional critical destination node.

The value of the criterion of quality of decoding (the bit error rate or else the erasure rate) of this critical destination node benefiting from this additional allocation is then updated in a step 1130.

According to another particular embodiment of the invention, for at least two subsets of different elementary networks detected during the step 520 of FIG. 5, the allocation method furthermore comprises steps for:

determining, in a step 550, for each subset of elementary networks, a value of a an overall criterion of quality of decoding for the destination nodes associated with said subset of elementary networks; and selecting, in a step 560, a subset having the smallest value of said overall criterion of decoding quality, indicating a maximum decoding quality.

Thus, among each subset of elementary networks that can apply the network encoding, one embodiment of the invention selects a subset of elementary networks for optimizing the quality of service of the network to the maximum extent. For example, this subset corresponds to a subset having the lowest value of the cumulated number of erasures in the subset.

It will be noted that one embodiment of the invention is not limited to a purely hardware implantation but that it can also be implemented in the form of a sequence of instructions of a computer program or any other form combining a hardware part and a software part. Should one embodiment of the invention be implanted partially or totally in software form, the corresponding sequence of instructions could be stored in a detachable storage means (such as for example a floppy, a CD-ROM or a DVD-ROM) or in a non-detachable storage means, this storage means being partially or totally readable by a computer or a microprocessor.

The invention claimed is:

1. Method for allocating bandwidth in a communications network, wherein the method comprises steps for:
   a) determining a subset of elementary networks from a set of possible elementary networks in a communications network, the elementary networks of said subset each being capable of simultaneously implementing an elementary network encoding scheme, the implementation of an elementary network encoding scheme enabling the release of a portion of bandwidth that can serve for the transmission of at least one data unit;
   b) determining at least one critical destination node in the communications network, a destination node being said to be critical when it has not been able to accurately decode at least one received data unit;
   b1) applying an elementary network encoding scheme in at least one elementary network of said subset, thereby releasing at least one bandwidth portion for a transmission of at least one additional data unit to said at least one critical destination node; and
   c) allocating the at least one bandwidth portion released by an application of said elementary network encoding scheme in the at least one elementary network of said subset, for a transmission of at least one additional data unit to said at least one critical destination node, enabling an improvement in the decoding capacity of said at least one critical destination node.

2. Method according to claim 1 wherein, in the step b), a destination node is said to be critical when a bit error rate or a symbol erasure rate associated with said destination node is above a predetermined threshold of accurate decoding of a data unit, said threshold indicating a minimum decoding quality.

3. Method according to claim 1 wherein, in the step b), said at least one received data unit making it possible to determine whether a destination node is critical is the last data unit received by said destination node.

4. Method according to claim 1 wherein the step c) comprises, for at least one released bandwidth portion, a step for selecting a critical destination node from among a plurality of critical destination nodes determined at the step b), said step for selecting comprising steps for:
   c1) determining the critical destination nodes that would become non-critical through the allocation of said released bandwidth portion;
   c2) selecting a destination node from among those determined at the step c1), and, for at least one released bandwidth portion, transmitting at least one additional data unit to the critical destination unit selected in the step c2).

5. Method according to claim 4 wherein the step c2) for selecting is performed among the destination nodes that have become critical after said application of said elementary network encoding scheme in at least one elementary network of said subset.

6. Method according to claim 4, wherein the step c2) for selecting is performed among the critical destination nodes having a bit error rate or a symbol erasure rate for which the difference with said predetermined accurate decoding threshold for the accurate decoding of one data unit is the greatest.

7. Method according to claim 4, wherein the step c2) comprises steps for:
   c2-i) estimating, for each destination node among those determined at the step c1), a first and second value of said bit error rate or said symbol erasure rate associated with the destination node, respectively without and with the allocation of said released bandwidth portion;
   c2-ii) determining, for each critical destination node among those determined at the step c1), the difference between first and second estimated values;
   c2-iii) selecting, among the destination nodes determined at the step c1), the destination node whose difference between said first and second values is the greatest.

8. Method according to claim 7 wherein, if no node is determined at the step c1), said step for selecting comprises steps for:
   c3-i) estimating, for each critical destination node among those determined at the step b), a first and second value of said bit error rate or of said symbol erasure rate associated with the destination node, respectively without and with the allocation of said released bandwidth portion;
   c3-ii) determining, for each critical destination node among those determined at the step b), the difference between said first and second estimated values;
   c3-iii) selecting, among the destination nodes determined at the step b), the destination node whose difference between said first and second values is the greatest.

9. Method according to claim 1 wherein the step c) comprises, for at least one released bandwidth portion, steps for:
   creating an additional elementary network through the allocation of said released bandwidth portion, said additional elementary network belonging to said subset of elementary networks and making it possible, by application of an elementary network encoding scheme, to release a portion of additional bandwidth that can serve for the transmission of at least one data unit;
   determining at least one additional critical destination node associated with said additional elementary network;
   allocating said released additional bandwidth portion for a transmission of data units to said at least one additional critical destination node.

10. Method according to claim 1 wherein the steps a), b) and c) are performed for at least two subsets of different elementary networks and in that said method comprises steps for:
   determining, for each subset of elementary networks applying at least one elementary network encoding scheme, a cumulated value of a symbol erasure rate associated with the destination nodes of the communications network; and
   selecting the subset possessing the smallest value of said cumulated symbol erasure rate, indicating a maximum decoding quality.

11. Method according to claim 10, wherein the step for selecting is performed from among said subset of elementary networks comprising solely destination networks that have remained non-critical after application of the elementary network encoding scheme.

12. Computer-readable storage means storing a computer program comprising a set of instructions executable by a computer to implement the method according to claim 1.

13. Device for allocating bandwidth in a communications network, wherein it comprises:

first means for determining a subset of elementary networks from a set of possible elementary networks in the communications network, the elementary networks of said subset each being capable of simultaneously implementing a elementary network encoding scheme, the implementing of an elementary network encoding scheme enabling the release of a portion of bandwidth that can serve for the transmission of at least one data unit;

second means for determining at least one critical destination node in the communications network, a destination node being said to be critical when it has not been able to accurately decode at least one received data unit;

means for applying an elementary network encoding scheme in at least one elementary network of said subset, thereby releasing at least one bandwidth portion for a transmission of at least one additional data unit to said at least one critical destination node;

first means for allocating the at least one bandwidth portion released by the use of the means for applying of said elementary network encoding scheme in the at least one elementary network of said subset, for a transmission of at least one additional data unit to said at least one critical destination node, enabling an improvement in the decoding capacity of said at least one critical destination node.

14. Device according to claim 13, wherein a destination node is said to be critical when a bit error rate or a symbol erasure rate associated with said destination node is above a predetermined threshold of accurate decoding of a data unit, said threshold indicating a minimum decoding quality.

15. Device according to claim 13, wherein said at least one received data unit, making it possible to determine whether a destination node is critical, is the last data unit received by said destination node.

16. Device according to claim 13, wherein it comprises, for at least one released bandwidth portion, first means for selecting a critical destination node from among a plurality of critical destination nodes, said selection means comprising:
third means for determining critical destination nodes that would become non-critical through the allocation of said released bandwidth portion;
second means for selecting a destination node from among those determined by said third determining means,
and in that, for at least one released bandwidth portion, at least one data unit is transmitted to the critical destination node selected by said second selection means.

17. Device according to claim 16, wherein said second selection means enable the selection of the nodes from among the critical destination nodes that have become critical after application of previously made elementary network encoding scheme.

18. Device according to claim 16, wherein said second selection means enable the selection of the nodes from among the critical destination nodes having a bit error rate or a symbol erasure rate for which the difference with said predetermined threshold for the accurate decoding of one data unit is the greatest.

19. Device according to claim 16, wherein it comprises:
first means for estimating, for each destination node among those determined by said third determining means, a first and second value of said bit error rate or said symbol erasure rate associated with the destination node, respectively without and with the allocation of said released bandwidth portion;
fourth means for determining, for each destination node among those determined by said third determining means, of the difference between first and second estimated values;
third means for selecting, among the destination nodes determined by said third determining means, the destination node whose difference between said first and second values is the greatest.

20. Device according to claim 19, wherein said third selection means comprise:
second means for estimating, for each critical destination node among those determined by said second determining means and if no node is determined by said third determining means, a first and second value of said bit error rate or of said symbol erasure rate associated with the destination node, respectively without and with the allocation of said released bandwidth portion;
fifth means for determining, for each critical destination node among those determined by said second determining means, the difference between said first and second estimated values;
fourth means for selecting, among the destination nodes determined by said second determining means, the destination node whose difference between said first and second values is the greatest.

21. Device according to claim 13, wherein it comprises, for at least one portion of released bandwidth:
means for creating an additional elementary network through the allocation of said released bandwidth portion, said additional elementary network belonging to said subset of elementary networks and making it possible, by application of an elementary network encoding scheme, to release a portion of additional bandwidth that can serve for the transmission of at least one data unit;
sixth means for determining at least one additional critical destination node associated with said additional elementary network;
second means for allocating said released additional bandwidth portion for a transmission of data units to said at least one additional critical destination node.

22. Device according to claim 13, wherein it comprises:
seventh means for determining, for each subset of elementary networks applying at least one elementary network encoding scheme, a cumulated value of a symbol erasure rate associated with the destination nodes of the communications network; and
fifth means for selecting, among at least two subsets of different elementary networks, a subset possessing the smallest value of said cumulated symbol erasure rate, indicating a maximum decoding quality.

23. Device according to claim 22, wherein said fifth selection means enable a selection, from among said subset of elementary networks comprising solely destination networks that have remained non-critical after application of the elementary network encoding scheme.

* * * * *